Patented Jan. 14, 1936

2,027,764

UNITED STATES PATENT OFFICE 2,027,764

BLUE AZO-DYESTUFF

Gérald Bonhôte, Basel, Switzerland, assignor to the firm of Society of Chemical Industry in Basle, Basel, Switzerland No Drawing. Application July 23, 1934, Serial No. 736,613. In Switzerland July 27, 1933

5 Claims. (Cl. 260—95)

In U. S. Patent No. 1,871,946 there is described a series of dyestuffs, particularly dyestuffs that dye violet, obtained by coupling arylides of 2,3-hydroxynaphthoic acid with diazo-compounds of the general formula

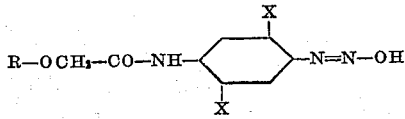

in which R is an aromatic nucleus of the benzene series and both X's are alkoxy.

The present invention relates to the manufacture of blue dyestuffs which are characterized by excellent properties of fastness, by coupling a diazo-compound of the above general formula, in which both X's represent ethoxy, with an arylide of 2,3-hydroxynaphthoic acid, which is itself obtainable by condensing 2,3-hydroxynaphthoic acid with an analogue or homologue of aniline which can be regarded as an ortho-substitution product thereof. Such analogues and homologues of aniline are, for instance ortho-toluidine, ortho-anisidine, para-xylidine, meta-xylidine, cresidine, chloranisidine $NH_2:OCH_3:Cl=1:2:5$, amino-hydroquinonedimethyl-ether, 4-chloro-2-toluidine, 2,4-dimethoxy-5-chloraniline, 1-aminotetraline or the like. There come also into consideration such amines which are substituted in ortho-position to the amino-group by an O-alkyl-group whose alkyl-groups contain more than one carbon atom. Such amines are, for example, the ortho-phenetidine; further the mixed ethers from ortho-aminophenol and aliphatic alcohols, such as propyl-, butyl-, amyl-alcohol, or also ether-alcohols, such as glycol, mono-butylether, glycol-mono-ethylether, glycerine-dibutylether, or the like.

Consequently, the new dyestuffs have the general formula

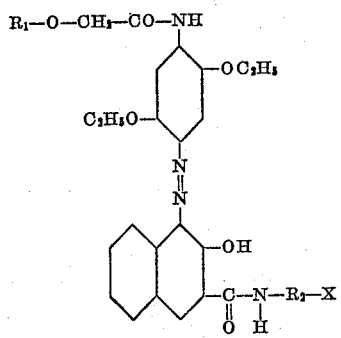

wherein $R_1$ stands for an aromatic nucleus of the benzene series, and $R_2$ also stands for an aromatic nucleus of the benzene series in which one of the ortho-positions to the CO-NH-group is occupied by the substituent X, X standing for a group of substituents consisting of alkyl or O-alkyl.

Particularly valuable dyeings are obtained when textiles (cotton, wool or silk) are grounded by the known method with the aforesaid arylide and then treated with the diazo-compound of the aforesaid constitution.

The following examples illustrate the invention:—

*Example 1*

34.4 parts by weight of 4-(4'-methyl)-phenoxy - acetylamino-2,5-diethoxy-1-aminobenzene are diazotized as usual and the diazo-solution is introduced into one of 27.7 parts of 2,3-hydroxynaphthoic acid ortho-toluidide, 50 parts of caustic soda solution of 30 per cent. strength, 30 parts of calcined sodium carbonate and 2000 parts of water. The dyestuff of the formula

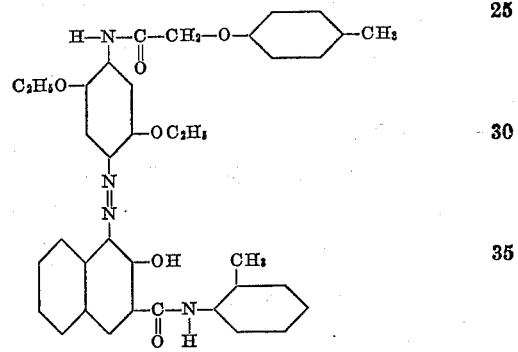

thus formed is immediately precipitated. The blue precipitate is filtered and dried.

*Example 2*

Cotton yarn is impregnated with a solution of 5 grams of 2,3-hydroxynaphthoic acid-2'-methoxyanilide, 10 cc. of caustic soda solution of 34° Bé. and 10 cc. of Turkey red oil, per liter; it is then wrung out and developed in a diazo-solution containing 2 grams of 4-(4'-methyl)-phenoxy-acetylamino-2,5-diethoxy-1-aminobenzene, per litre. There is produced a pure blue tint of very good fastness to washing, chlorine, kier-boiling and light.

Similar blue tints are obtained when the arylide used is 2,3-hydroxynaphthoic acid 2'-toluidide or the 2'-ethoxyanilide; 2',5'-dimethoxyanilide; 2', 4'-dimethoxy-5'-chloranilide; 2'-methoxy- or 2'-ethoxy-5'-methylanilide; 2',4'- or 2',5'-dimethyl-anilide or also the 2'-methoxy or 2'-ethoxy-5'-chloro or 5'-bromo-anilide.

*Example 3*

Cotton yarn is impregnated with an alkaline grounding liquor containing per liter 5 grams of 2,3-hydroxynaphtoic acid-ortho-toluidide and is then well wrung out. It is then developed in a solution containing 2 grams of 4-phenoxyacetylamino-2,5-diethoxy-1-aminobenzene, per litre. There is produced a pure blue tint which is very fast. The formula of the new dyestuff is:—

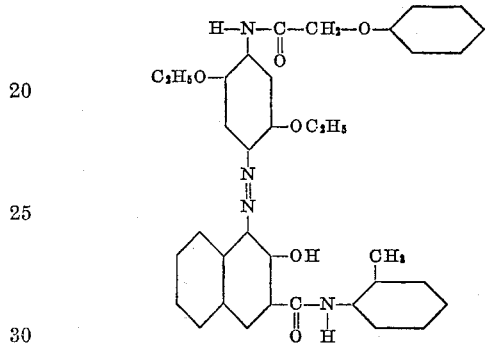

Similar blue tints are obtained when the other arylides used in Example 2 are substituted for the 2,3-hydroxynaphthoic acid-ortho-toluidide.

*Example 4*

The material to be printed is foularded with an alkaline solution containing per litre 12 grams of 2,3-hydroxynaphthoic acid-2'-methyl-5'-chloranilide. After drying, the material is printed with a printing color containing, per kilo, 8 grams of the diazotized 4-(3'-methyl)-phenoxyacetylamino-2,5-diethoxy-1-aminobenzene. The pure greenish-blue color develops quickly and is very fast. The formula of the new dyestuff is:—

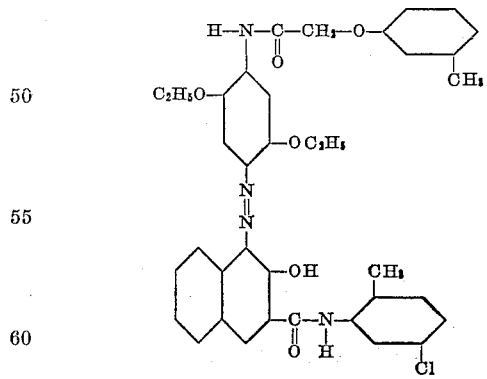

Similar blue tints are obtained when the 2'-methoxyanilide or the 2'-methylanilide of 2,3-hydroxynaphthoic acid is used.

When in place of the diazotizing base of this example there is used, for instance, 4-(4'-chloro)- or 4-(2'-chloro)-phenoxy-acetylamino-2,5-diethoxy-1-aminobenzene, very pure and fast blue tints are obtained. Valuable dyestuffs are also obtained with diazotizing components such as 4-(3'-chloro)- or 4-(4'-methoxy)- or 4-(4'-ethoxy)- or 4-(3'-methoxy)- or 4-(2'-ethoxy)- or 4-(2'-methoxy)- phenoxyacetylamino - 2,5 - diethoxy-1-aminobenzene and the arylides of 2,3-hydroxynaphthoic acid mentioned in the 4 examples, or suggested in the introductory paragraphs.

What I claim is:—

1. The dyestuffs of the general formula

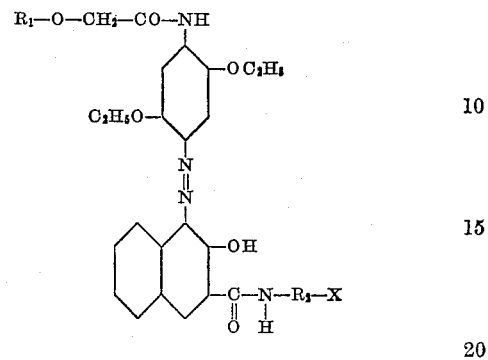

wherein $R_1$ represents an aromatic nucleus of the benzene series, and $R_2$ also represents an aromatic nucleus of the benzene series in which one of the ortho-positions to the CONH-group is occupied by the substituent X, X standing for a group of substituents consisting of methyl and O-alkyl, the alkyl radical of the O-alkyl-group consisting at most of 2 carbon atoms, which products form dark powders dissolving in pyridine to blue-violet to blue solutions and dyeing cotton fast blue tints.

2. The dyestuffs of the general formula

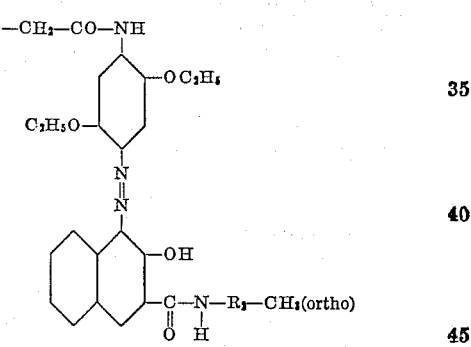

wherein $R_1$ represents an aromatic nucleus of the benzene series, and $R_2$ also represents an aromatic nucleus of the benzene series, which products form dark powders dissolving in pyridine to blue-violet to blue solutions and dyeing cotton fast blue tints.

3. The dyestuffs of the general formula

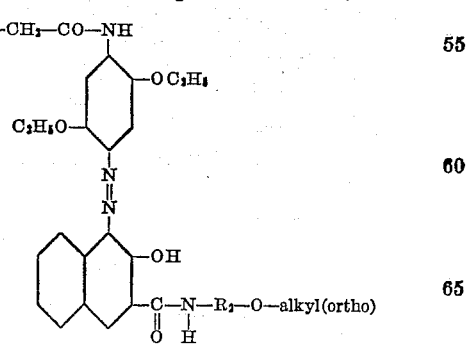

wherein $R_1$ represents an aromatic nucleus of the benzene series, and $R_2$ also represents an aromatic nucleus of the benzene series, the alkyl-group consisting at most of 2 carbon atoms, which products form dark powders dissolving in pyridine to blue-violet to blue solutions and dyeing cotton fast blue tints.

4. The azo-dyestuff of the formula
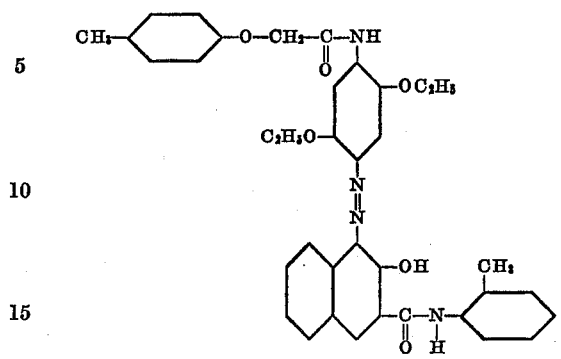
which product dissolves in pyridine to a blue solution and dyes cotton fast blue tints.
5. The azo-dyestuff of the formula
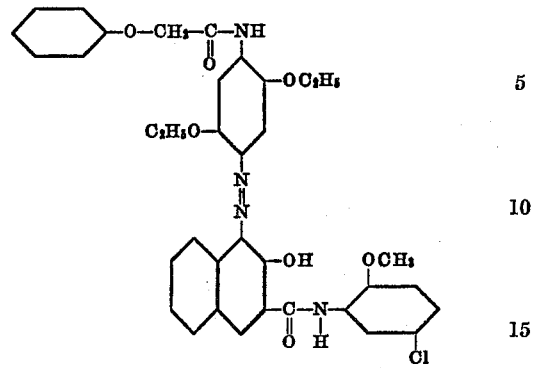
which product dissolves in pyridine to a blue solution and dyes cotton fast blue tints.
GÉRALD BONHÔTE.